(12) United States Patent
Saito et al.

(10) Patent No.: US 6,716,942 B1
(45) Date of Patent: Apr. 6, 2004

(54) PROCESS FOR PRODUCING FLUOROPOLYMER

(75) Inventors: Hideya Saito, Settsu (JP); Tetsuya Higuchi, Settsu (JP); Satoshi Komatsu, Settsu (JP); Satoshi Koyama, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/913,152

(22) PCT Filed: Feb. 10, 2000

(86) PCT No.: PCT/JP00/00735

§ 371 (c)(1), (2), (4) Date: Aug. 10, 2001

(87) PCT Pub. No.: WO00/47641

PCT Pub. Date: Aug. 17, 2000

(30) Foreign Application Priority Data

Feb. 15, 1999 (JP) .............................................. 11-36152

(51) Int. Cl.[7] .............................................. C08F 114/18
(52) U.S. Cl. ....................................... 526/242; 526/255
(58) Field of Search .................................. 526/242, 255

(56) References Cited

U.S. PATENT DOCUMENTS

| | | | | |
|---|---|---|---|---|
| 2,968,649 A | * | 1/1961 | Pailthorp | |
| 4,123,603 A | | 10/1978 | Stewart, Jr. | |
| 4,166,165 A | | 8/1979 | Hisasue et al. | |
| 6,107,423 A | * | 8/2000 | Wheland | 526/249 |
| 6,133,389 A | * | 10/2000 | Anolick | 526/206 |
| 6,177,532 B1 | * | 1/2001 | Otani | 526/249 |
| 6,228,963 B1 | * | 5/2001 | Wheland | 526/247 |
| 6,423,798 B2 | * | 7/2002 | Wheland | 526/206 |

FOREIGN PATENT DOCUMENTS

| | | |
|---|---|---|
| EP | 0 911347 A2 | 4/1999 |
| JP | 52-134696 | 11/1977 |
| JP | 6-345824 | 12/1994 |
| WO | WO 96/01851 A1 | 1/1996 |
| WO | WO 96/24624 A2 | 8/1996 |

OTHER PUBLICATIONS

English language translation of the International Preliminary Examination Report for PCT/JP00/00735 dated May 7, 2001.
Supplementary European Search Report for EP 00 90 2896 dated May 7, 2002.

* cited by examiner

Primary Examiner—Bernard Lipman
(74) Attorney, Agent, or Firm—Sughrue Mion, PLLC

(57) ABSTRACT

A process for preparing a fluoropolymer by polymerizing one or more radically polymerizable monomers comprising at least one fluoroolefin monomer in the presence of a radical polymerization initiator and as case demands, an inactive fluorocarbon and chain transfer agent in a reaction field where at least one of components forming the reaction field is in a supercritical state. According to the preparation process, generation of unstable end groups of the polymer, a decrease in a purity and complicated post-treatment can be eliminated.

21 Claims, No Drawings

PROCESS FOR PRODUCING FLUOROPOLYMER

TECHNICAL FIELD

The present invention relates to a process for preparing a fluoropolymer by polymerizing in a supercritical state.

BACKGROUND ART

Fluoropolymers have excellent chemical resistance, solvent resistance and heat resistance and therefore are used widely in an industrial field such as automobile industry, semi-conductor industry and chemical industry as a starting material for a sealing member to be used under critical conditions.

Hitherto preparation of fluoropolymers has been carried out by emulsion polymerization or suspension polymerization of a fluoroolefin in an aqueous medium by using a water soluble radical initiator or an oil soluble radical initiator. A polymerization reaction field thereof was substantially in produced polymer particles or in an inactive solvent which hardly affect the polymerization reaction.

In a conventional emulsion polymerization method which is carried out by employing an aqueous medium, generally a water soluble initiator is used, and therefore an end group of a produced polymer is ionic. When the polymer is used as a rubber, an end group thereof reduces a vulcanization reaction rate at vulcanizing and compression set of a final vulcanized article increases. Also when the polymer is used for other applications, the end group has an adverse effect on a molded article, i.e. causing a foaming of the molded article. A solid polymer is prepared by agglomerating an aqueous dispersion obtained after the polymerization reaction by using a proper coagulant and then dehydrating and drying, which, however, requires long and :complicated steps and cannot be said to be an effective preparation process. Further if a residue of the ionic initiator is mixed to the product, there is a problem when an obtained molded article is used as parts for semi-conductor production apparatuses.

In case of the suspension polymerization, there arises a problem with an adherence of a produced polymer on walls of a reactor due to precipitation thereof, which causes a decrease in yield of polymer and an increase in polymer production cost.

In recent years researches have been made actively with respect to use of a supercritical fluid, mainly carbon dioxide, as a reaction field. The supercritical fluid is a fluid having temperature and pressure range higher than the both of critical temperature and critical pressure, and generally the range not so exceeding critical points greatly tends to be used positively from economical point of view.

The supercritical fluid has properties suitable as a reaction medium because of a good thermal conductivity, a rapid diffusion and a small viscosity.

With respect to polymerization of a fluoroolefin which is carried out by employing a supercritical fluid, for example, Japanese Patent Publication No. 505429/1995 discloses a radical polymerization reaction of fluoroacrylate by using supercritical carbon dioxide as a reaction field. Also U.S. Pat. No. 5,312,882 discloses polymerization by using supercritical carbon dioxide as a continuous phase and a monomer as a dispersion phase in the presence of a surfactant which has a moiety having affinity for carbon dioxide. U.S. Pat. No. 5,527,865 discloses a radical polymerization of tetrafluoroethylene in two separate phases in the presence of a fluorine-containing anionic surfactant by using supercritical carbon dioxide and water simultaneously. Further U.S. Pat. No. 5,618,894 describes that polymerization of tetrafluoroethylene, copolymerization of tetrafluoroethylene and perfluoro(propyl vinyl ether) and copolymerization of vinylidene fluoride and hexafluoropropylene are carried out under non-aqueous condition in supercritical carbon dioxide by using a radical polymerization initiator being capable of generating stable polymer end groups. In all of those polymerization reactions, the supercritical fluid is limited to carbon dioxide or a mixture containing carbon dioxide. Japanese Patent Publication No.502691/1998 discloses a reaction by using a liquid being maintained at a pressure higher than atmospheric pressure, supercritical fluid such as carbon dioxide, hydrofluorocarbon, perfluorocarbon, or a mixture thereof. However a dispersion aid is required as an essential component in the reaction field, which is not preferable from the viewpoint of an increase in a purity of an obtained polymer, and a monomer which is a reactive substance is not used as a supercritical fluid.

Examples of polymerization reaction of fluoroolefin in a supercritical fluid by using the monomer itself as the supercritical fluid are tetrafluoroethylene/hexafluoropropylene copolymerization described in U.S. Pat. No. 3,062,793, tetrafluoroethylene/hexafluoropropylene copolymerization and vinylidene fluoride/hexafluoropropylene copolymerization described in WO96/24624, and the like. However in the former publication, there is no description as to vinylidene fluoride, and the reaction is carried out under the condition of about 200 MPa or more. In the latter publication, the reaction is carried out under critical conditions of very high temperature and pressure of from 41 to 690 MPa and from 200° to 400° C., respectively. Therefore there is a disadvantage that installation cost in commercial scale becomes high.

As a result of intensive study to solve the problems such as generation of unstable polymer end groups, lowering of a purity and complicated post-treatment, the inventors of the present invention could solve the above-mentioned problems by forming a supercritical state in the presence of minimum components for polymerization reaction and have completed a process for preparing a fluoropolymer which can reduce an installation cost in commercial scale.

DISCLOSURE OF INVENTION

Namely the present invention relates to the process for preparing a fluoropolymer by polymerizing one or more radically polymerizable monomers comprising at least one fluoroolefin monomer in the presence of a radical polymerization initiator in a reaction field where at least one of the monomers is in a supercritical state.

Also the present invention relates to the process for preparing a fluoropolymer by polymerizing one or more radically polymerizable monomers comprising at least one fluoroolefin monomer substantially in the absence of water in the presence of a radical polymerization initiator in a reaction field where the whole pressure in the polymerization system is 40 MPa or less in an absolute pressure and at least one of the monomers is in a supercritical state.

Also the present invention relates to the process for preparing a fluoropolymer by polymerizing one or more radically polymerizable monomers comprising at least one fluoroolefin monomer in the presence of a radical polymerization initiator and an inactive fluorocarbon in a reaction field where at least one selected from the group consisting of the monomers and fluorocarbon is in a supercritical state.

Also the present invention relates to the process for preparing a fluoropolymer by polymerizing one or more radically polymerizable monomers comprising at least one fluoroolefin monomer substantially in the absence of water in the presence of a radical polymerization initiator and an inactive fluorocarbon in a reaction field where the whole pressure in the polymerization system is 40 MPa or less in an absolute pressure and at least one selected from the group consisting of the monomers and fluorocarbon is in a supercritical state.

Further in those polymerization processes, the polymerization may be carried out in a reaction field where a chain transfer agent is present.

BEST MODE FOR CARRYING OUT THE INVENTION

In the present invention, "a reaction field where at least one of the monomers is in a supercritical state" and "a reaction field where at least one selected from the group consisting of the monomers and fluorocarbon is in a supercritical state" mean the following reaction fields.

①  In case of using no fluorocarbon and using one monomer, a reaction field in a state exceeding both of critical pressure and critical temperature of the monomer.

②  In case of using no fluorocarbon and using two or more monomers, a reaction field in a state exceeding both of the lowest critical pressure and the lowest critical temperature of those monomers individually. For example, in case of using two monomers of vinylidene fluoride (VdF, critical pressure (Pc)=4.430 MPa, critical temperature (Tc)= 30.15° C.) and hexafluoropropylene (HFP, Pc=2.900 MPa, Tc=93.95° C.), a reaction field in a state exceeding 2.900 MPa which is a critical pressure of HFP and 30.15° C. which is a critical temperature of VdF (for example, Pc=3.5 MPa, Tc=50° C.) is in a supercritical state in the present invention.

③  In case of using fluorocarbon and at least one monomer, a reaction field in a state exceeding both of the lowest critical pressure and the lowest critical temperature of those components individually like the above case ②.

In the present invention, from the viewpoint of enhancement of energy efficiency and reduction of installation cost, it is preferable that a reaction field in a range approximate to the above-mentioned lowest critical points (pressure and temperature) is used as those reaction fields in a supercritical state.

Whether or not the reaction field is in a supercritical state of the present invention can be judged by determining a saturated state of a system to be measured and a relation between a pressure, density and temperature (PVT measurement) in one phase. However when actual values are difficult to obtain, estimated values ("Elementary Edition of Chemical Handbook, 5th Rev." by The Chemical Society of Japan, p. 6, issued by Maruzen Corporation, (Mar. 15, 1995)) can be used instead of them.

In the present invention, one or more radically polymerizable monomers comprising at least one fluoroolefin monomer are polymerized in a reaction field being in a supercritical state in the presence of a radical polymerization initiator or in the presence of an inactive fluorocarbon and a radical polymerization initiator.

In the present invention, examples of components forming a reaction field being in a supercritical state are:

(1) only one or more radically polymerizable monomers comprising at least one fluoroolefin monomer, and (2) a mixture of one or more radically polymerizable monomers comprising at least one fluoroolefin monomer and an inactive fluorocarbon.

Examples of the usable radically polymerizable monomer are:

(i) one fluoroolefin monomer, (ii) a mixture of two or more fluoroolefin monomers, (iii) a mixture of one fluoroolefin monomer and one or more non-fluoroolefin monomers, and (iv) a mixture of two or more fluoroolefin monomers and one or more non-fluoroolefin monomers.

Examples of the fluoroolefin monomer are perfluoroolefin monomers such as tetrafluoroethylene (TFE), hexafluoropropylene (HFP), perfluoro(alkyl vinyl ether) (PAVE),

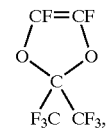

and $CF_2=CFOCF_2CF=CF_2$; and non-perfluoroolefin monomers such as vinylidene fluoride (VdF), trifluoroethylene, vinyl fluoride, trifluoropropylene, pentafluoropropylene, tetrafluoropropylene and hexafluoroisobutene. Examples of PAVE are perfluoro(methyl vinyl ether) (PMVE), perfluoro(ethyl vinyl ether) (PEVE), perfluoro(propyl vinyl ether) (PPVE), and the like.

Also functional group-containing fluoroolefin monomers can be used. Examples of the functional group-containing fluoroolefin are, for instance, those represented by the formula:

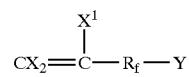

wherein Y is $-CH_2OH$, $-COOH$, $-SO_2F$, $-SO_3M$ (M is hydrogen, $NH_4$ group or alkali metal), carboxylic acid salt, carboxyester group, epoxy group or nitrile group, X and $X^1$ are the same or different and each is hydrogen atom or fluorine atom, $R_f$ is a divalent fluorine-containing alkylene group having 1 to 40 carbon atoms or a divalent fluorine-containing alkylene group having 1 to 40 carbon atoms and ether bond. Examples thereof are, for instance,

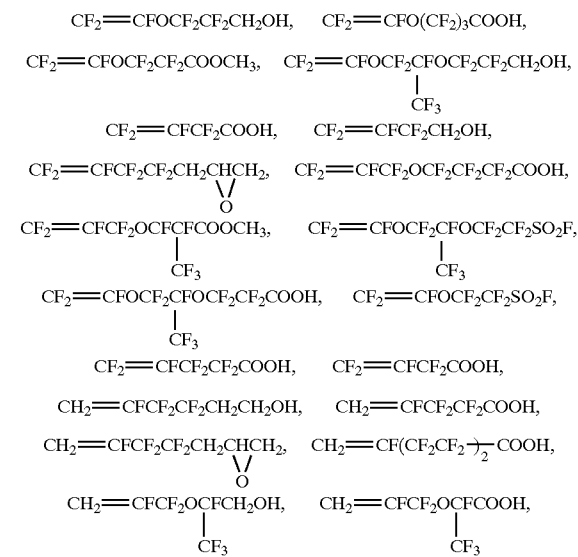

-continued

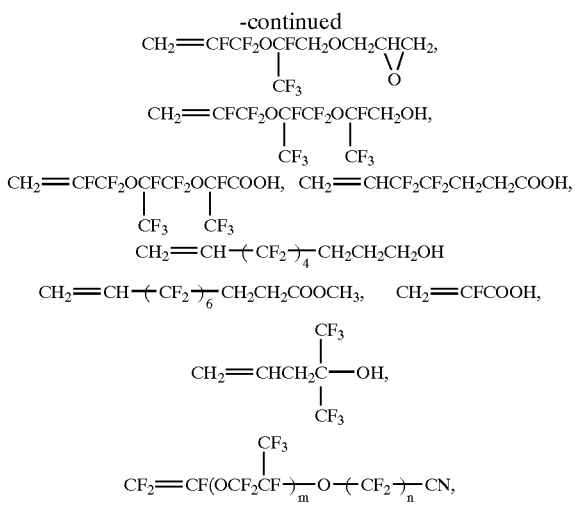

wherein m is 0 to 5, n is 1 to 8,

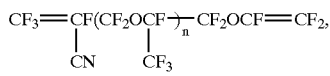

wherein n is 1 to 4,

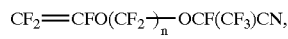

wherein n is 2 to 5,

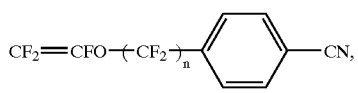

wherein n is 1 to 6,

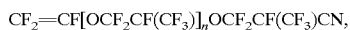

wherein n is 1 or 2,

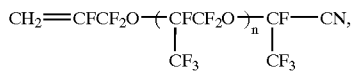

wherein n is 1 or 2, and the like.

In addition, iodine-containing monomers, for example, iodinated perfluoro(vinyl ethers) such as perfluoro(6,6-dihydro-6-iodo-3-oxa-1-hexene) and perfluoro(5-iodo-3-oxa-1-pentene) described in JP-B-5-63482 and JP-A-62-12734 can be copolymerized as a non-perfluoroolefin monomer.

Examples of the non-fluoroolefin monomer are, for instance, α-olefin monomers having 2 to 10 carbon atoms such as ethylene (ET), propylene, butene and pentene; alkyl vinyl ethers having an alkyl group of 1 to 20 carbon atoms such as methyl vinyl ether, ethyl vinyl ether, propyl vinyl ether, cyclohexyl vinyl ether, hydroxybutyl vinyl ether and butyl vinyl ether; and the like.

The polymerization in a reaction field being in a super-critical state of the present invention can be applied particularly suitably to the following combinations of radically polymerizable monomers:

(a) polymerization of one of VdF, TFE, CTFE or the like,
(b) copolymerization of VdF and HFP (50 to 99/1 to 50 in mole ratio),
(c) copolymerization of VdF, HFP and TFE (50 to 98/1 to 40/1 to 40 in mole ratio),
(d) copolymerization of HFP and ethylene (1 to 50/50 to 99 in mole ratio),
(e) copolymerization of HFP, ethylene and TFE (1 to 50/40 to 98/1 to 45 in mole ratio),
(f) copolymerization of PAVE and TFE (1 to 50/50 to 99 in mole ratio),
(g) copolymerization of TFE and HFP (50 to 99/1 to 50 in mole ratio),
(h) copolymerization of TFE and ET (1 to 99/1 to 99 in mole ratio),
(i) copolymerization of TFE and propylene (1 to 99 /1 to 99 in mole ratio),
(j) copolymerization of VdF and TFE (1 to 99/1 to 99 in mole ratio),
(k) copolymerization of VdF and CTFE (1 to 99/1 to 99 in mole ratio),
(l) copolymerization of VdF, CTFE and TFE (50 to 98/1 to 30/1 to 30 in mole ratio),
(m) copolymerization of TFE, VdF and propylene (30 to 98/1 to 50/1 to 50 in mole ratio),
(n) copolymerization of ethylene., HFP and VdF (10 to 85/10 to 45/1 to 45 in mole ratio),
(o) copolymerization of ethylene, HFP, VdF and TFE (10 to 85/10 to 45/1 to 45/1 to 30 in mole ratio),
and the like.

In the present invention, a fluorocarbon may be present in the reaction field. Examples of the fluorocarbon are hydrofluorocarbons such as pentafluoroethane, tetrafluoroethane, trifluoroethane, trifluoromethane and difluoromethane; perfluorocarbons such as perfluoroethane and perfluorocyclobutane; and the like. Those fluorocarbons function as a diluting agent for the monomer in the reaction field, help eliminate a reaction heat and adjust a solubility of a produced polymer into a reaction system.

An amount of the fluorocarbon when used is from 1 to 500% by weight, preferably 1 to 300% by weight, particularly preferably 1 to 200% by weight on the basis of the total amount of the monomers. If the amount is too large, an amount of the fluorocarbon to be recovered after the reaction increases, which is not preferable. From the viewpoint of obtaining a high molecular weight product, it is preferable that the produced polymer does not dissolve in the reaction system completely and is in a dispersed state.

In the present invention, water may be present in the reaction field. However it is rather preferable to make water absent substantially in order to simplify a post-treatment step.

Also in the present invention, a chain transfer agent may be added to adjust a molecular weight of the polymer to a desired weight.

Examples of the chain transfer agent are hydrocarbons, halogenated hydrocarbons, and in addition, hydrocarbon alcohols, esters, ketones, mercaptans, and the like. Examples of the hydrocarbon are those having 4 to 6 carbon atoms such as pentane, butane and hexane. Examples of the halogenated hydrocarbon are, for instance, tetrachloromethane, methylene chloride, and the like. Examples of the hydrocarbon alcohol are, for instance, methanol, ethanol, isopropanol, and the like. Examples of the hydrocarbon ester are, for instance, methyl acetate, ethyl acetate, butyl acetate, ethyl propionate, ethyl acetoacetate, dimethyl malonate, diethyl malonate, dimethyl succinate, diethyl succinate, and the like. Examples of the hydrocarbon ketone are, for instance, acetone, acetylacetone, cyclohexanone, and the like. Examples of the mercaptan are, for instance, dodecylmercaptan, and the like. Among them, from the viewpoint of being capable of decreasing a molecular weight greatly by adding in a small amount thereof, pentane, butane, diethyl malonate, tetrachloromethane, acetone and dodecylmercaptan are preferable.

An amount of the chain transfer agent may be optionally determined depending on a desired molecular weight of the polymer. The amount thereof is usually from 0.01 to 5% by weight, particularly preferably 0.1 to 2% by weight on the basis of the total amount of the monomers.

In the present invention the polymerization of radically polymerizable monomer is carried out in the presence of a radical polymerization initiator in a reaction field being in a supercritical state.

Examples of the method for making the reaction field being in a supercritical state are, for instance, a method of forming the supercritical state by putting a monomer and as case demands, a fluorocarbon into a pressure resistant polymerization reactor and heating up to a critical temperature or more, thereby adjusting to a critical pressure, a method of forming the supercritical state by putting continuously a monomer and as case demands, a fluorocarbon into a pressure resistant reactor adjusted to a critical pressure or more and a critical temperature or more, and the like method. The polymerization can be carried out by any of batchwise, semi-batchwise and continuous methods.

Critical pressure (Pc) and critical temperature (Tc) of typical monomers and fluorocarbons are raised below for reference.

| Name of Substance | Pc (MPa) | Tc (K) | Reference |
|---|---|---|---|
| Monomer | | | |
| VdF | 4.430 | 303.30 | 1 |
| HFP | 2.900 | 367.10 | 2 |
| TFE | 3.940 | 306.00 | 3 |
| CTFE | 3.960 | 379.00 | 4 |
| PMVE | 2.803 | 362.33 | 5 |
| PEVE | 2.266 | 394.67 | 5 |
| PPVE | 1.901 | 423.51 | 5 |
| Ethylene | 5.041 | 282.34 | 6 |
| Propylene | 4.600 | 364.90 | 6 |
| Fluorocarbon | | | |
| Perfluoromethane | 3.745 | 227.51 | 7 |
| Trifluoromethane | 4.836 | 298.97 | 7 |
| Difluoromethane | 5.830 | 351.55 | 8 |
| Perfluoroethane | 3.043 | 293.03 | 9 |
| 1,1,1,2-tetrafluoroethane | 4.056 | 374.18 | 10 |
| 1,1,1-trifluoroethane | 3.765 | 345.75 | 11 |
| 1,1-difluoroethane | 4.516 | 386.41 | 7 |
| Perfluorocyclobutane | 2.773 | 388.37 | 12 |

References are those mentioned below.

1: Riddick, J. A., Bunger, W. B., Sakano, T. K., "Organic Solvents: Physical Properties and Methods of Purification", 4th Ed., Wiley Interscience, N.Y. (1986).
2: Matheson Company, Inc., "Matheson Gas Data Book" unabridged ed., 4 vols., East Rutherford, N.J. (1974).
3: Weiss, G., "Hazardous Chemicals Data Book", Noyes Data Corp. Park Ridge, N.J. (1986).
4: Engineering Sciences Data, Item 91006, "Vapor Pressures and Critical Points of Liquids. Halogenated Ethylenes", ESDU, London April (1991).
5: Estimated (Lydersen method).
6: Tsonopoulos, C., Ambrose, D., "Vapor-Liquid Critical Properties of Elements and Compounds. 6. Unsaturated Aliphatic Hydrocarbons" J. Chem. Eng. Data 41,645 (1996).
7: Thermodynamics Research Center, "TRC Thermodynamic Tables, Non-Hydrocarbons" The Texas A&M University System, College Station, Tex. (1996).
8: Gross, U., Song, Y. W., "Thermal Conductivities of New Refrigerants R125 and R32 Measured by the Transient Hot-Wire Method" Int. J. Thermophys. 17(3), 607 (1996).
9: Wilson, L. C., Wilding, W. V., Wilson, H. L., Wilson, G. M., "Critical Point Measurements by a New Flow Method and a Traditional Static Method" J. Chem. Eng. Data 40,765 (1995).
10: McLinden, M. O., Huber, M. L., Outcalt, S. V., "Thermophysical Properties of Alternative Refrigerants: Status of the HFCs" ASME Winter Annual Meeting, New Orleans, La.-Nov. 18 (1993).
11: Nagel, Bier, K., Int. J. Refrigeration 19(4), 264 (1996).
12: Thermodynamics Research Center, "Selected Values of Properties of Chemical Compounds", Data Project, Texas A&M University, College Station, Tex. (1983).

When the components forming the reaction field are a mixture, there is a case where the critical pressure and/or critical temperature decrease or increase as compared with the case of a single component. However in the present invention, as mentioned above, the pressure and temperature may be a minimum critical pressure or more and a minimum critical temperature or more, respectively in an actual reaction field.

As mentioned above, in the present invention the polymerization conditions depend on conditions for forming a supercritical state and are not limited. However the polymerization conditions near the critical points are preferable. For example, a polymerization pressure is from 2 to 40 MPa, preferably 4 to 10 MPa, and a polymerization temperature is from 10° to 200° C., preferably 50° to 150° C. A polymerization time is from about 0.1 hour to about 50 hours. When the polymerization temperature and pressure are as high as exceeding the respective critical points greatly, installation cost for polymerization reaction increases.

The polymerization is carried out in the presence of a radical polymerization initiator. Examples of the radical polymerization initiator are, for instance, organic or inorganic peroxide, persulfate, azo compound, and the like.

Examples of the organic peroxide are, for instance, dialkyl peroxides such as 2,5-dimethyl-2,5-bis(t-butylperoxy)hexane and di-t-butyl peroxide; diacyl peroxides such as isobutyl peroxide, 3,5,5-trimethylhexanoyl peroxide, octanoyl peroxide, lauroyl peroxide, stearoyl peroxide and succinic acid peroxide; peroxy dicarbonates such as dinormalpropyl peroxydicarbonate, diisopropyl peroxydicarbonate, bis(4-t-butylcyclohexyl) peroxydicarbonate, di-2-ethoxyethyl peroxydicarbonate, di-2-ethylhexyl peroxydicarbonate and di-2-methoxybutyl peroxydicarbonate; peroxy esters such as 1,1,3,3-tetramethylbutyl peroxyneodecanoate, 1-cyclohexyl-1-methylethyl peroxyneodecanoate, t-hexyl peroxyneodecanoate, t-butyl peroxyneodecanoate, t-hexyl peroxypyvalate, t-butyl peroxypyvalate, 1,1,3,3-tetramethylbutyl peroxy-2-ethylhexanoate, 2,5-dimethyl-2,5-bis(2-ethylhexanoylperoxy)hexane, 1-cyclohexyl-1-methylethylperoxy-2-ethylhexanoate, t-hexylperoxy-2-ethylhexanoate, t-butylperoxy-2-ethylhexanoate, t-butylperoxy isobutyrate, t-hexylperoxyisopropyl monocarbonate, t-butylperoxy-3,5,5-trimethylhexanoate, t-butylperoxy laurate, t-butylperoxyisopropyl monocarbonate, t-butylperoxy-2-ethyhexyl monocarbonate and t-butylperoxy acetate;

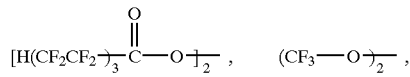

and the like.

Example of the inorganic peroxide is, for instance, hydrogen peroxide.

Examples of the persulfate are, for instance, ammonium persulfate, sodium persulfate, potassium persulfate, and the like.

In case of peroxide and persulfate, the initiator can be used in combination with a reducing agent.

Examples of the azo compounds are, for instance, cyano-2-propyl azoformamide, 1,1'-azobis(cyclohexane-1-carbonitrile), 2,2'-azobis(2-amidinopropane) dihydrochloride, 2,2'-azobis(2-methylbutyronitrile), 2,2'-azobisisobutyronitrile, 2,2'-azobis(2,4-dimethylvaleronitrile), 2,2'-azobis[N-(2-propenyl)-2-methylpropionamide], macro azo compound containing polydimethylsiloxane segment, 2,2'-azobis(2,4,4-trimethylpentane), 2,2'-azobis(4-methoxy-2,4-dimethylvaleronitrile), 4,4'-azobis(4-cyanovalerate), dimethyl 2,2'-azobis(isobutyrate), 2,2'-azobis[2-(2-imidazoline-2-yl)propane]dihydrochloride, 2,2'-azobis[2-(2-imidazoline-2-yl)propane]disulfate dihydrate, 2,2'-azobis[2-(2-(imidazoline-2-yl)propane], 2,2'-azobis{2 -methyl-N-[1,1-bis(hydroxymethyl)-2 -hydroxyethyl]propionamide}, 2,2'-azobis{2 -methyl-N-[1,1-bis(hydroxymethyl)ethyl] propionamide}, 2,2'-azobis[2-methyl-N-(2-hydroxyethyl) propionamide], 2,2'-azobisisobutylamide dihydrate, 2,2'-azobis[2-(hydroxymethyl)propionitrile], and the like.

An amount of the radical polymerization initiator is from 0.005 to 10% by weight, preferably 0.05 to 2% by weight on the basis of a total amount of the monomers.

In case where a method of iodine transfer polymerization (cf. JP-A-53-125491) is used in the preparation process of the present invention, when the polymerization is carried out in the presence of a compound represented by the formula (I):

R(I)x(Br)y        (I)

wherein R is a saturated or un-saturated divalent fluoro hydrocarbon group or divalent chlorofluoro hydrocarbon group having 1 to 16 carbon atoms or a saturated or un-saturated divalent hydrocarbon group having 1 to 3 carbon atoms, each of x and y is 0, 1 or 2, x+y=2, it is advantageous because a polymerization rate is increased.

Examples of the compound represented by the formula (I) are, for instance, 1,3-diiodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene- 1, 2-bromo-4-iodoperfluorobutene- 1, substitution products having a substituent at various positions such as monoiodomonobromo-substituted product, diiodomonobromo-substituted product, monoiododibromo-substituted product and (2-iodoethyl)- and (2-bromoethyl)-substituted products of benzene, and the like.

Among them, from the viewpoint of polymerization reactivity, crosslinking reactivity and availability, 1,4-diiodoperfluorobutane and diiodomethane are preferably used.

In the present invention other additives may be added unless they do not take part in the reaction. Examples of the additive are a solvent for the radical polymerization initiator (perfluorohexane, 2,2,3,3-tetrafluoropropylene alcohol, or the like), and the like.

According to the preparation process of the present invention, a fluorine-containing homopolymer or copolymer comprising the above-mentioned radically polymerizable monomer as a component unit can be prepared. Those fluoropolymers may be a resin or an elastomer.

Non-restricted examples of the fluoropolymer which can be prepared as a resin are polytetrafluoroethylene (PTFE), polyvinylidene fluoride (PVdF), polychlorotrifluoroethylene (PCTFE), VdF-TFE copolymer, VdF-TFE-CTFE copolymer, TFE-HFP copolymer (FEP, HFP content: 30% by mole or less), TFE-PAVE copolymer (PFA, PAVE content: 20% by mole or less), and the like. Examples of the fluoropolymer as an elastomer are VdF-HFP copolymer, VdF-HFP-TFE copolymer, HFP-ET copolymer, HFP-ET-TFE copolymer, HFP-ET-VdF copolymer, HFP-ET-VdF-TFE copolymer, TFE-PAVE copolymer (PAVE content: 21 to 50% by mole), TFE-HFP copolymer (HFP content: 31 to 50% by mole), TFE-propylene copolymer, VdF—CTFE copolymer, TFE-VdF-propylene copolymer, and the like.

The present invention is then explained by means of examples, but is not limited to those examples.

EXAMPLE 1

After the inside of a 548-ml stainless steel autoclave was replaced with nitrogen sufficiently, the autoclave was charged with 114.2 g of hexafluoropropylene (HFP) and 40.2 g of vinylidene fluoride (VdF) in a vacuum state by means of a high pressure plunger pump and when an inside temperature of the system (reaction temperature) was increased to 120° C., an inside pressure of the system became 5.13 MPa.

Then a solution prepared by dissolving 1.18 g of PERBUTYL I (t-butylperoxyisopropyl monocarbonate available from NOF Corporation) as an organic peroxide radical polymerization initiator in 4.00 g of 2,2,3,3-tetrafluoro-n-propyl alcohol was introduced into a reaction field with nitrogen under pressure to initiate a polymerization. The pressure and temperature in the polymerization reaction field were 5.13 MPa and 120° C., respectively. In those pressure and temperature conditions, since the pressure exceeds Pc of HFP (2.900 MPa) and the temperature exceeds Tc of VdF (30.15° C.), the formed reaction field was in a supercritical state of the present invention.

Since the pressure inside the polymerization system decreased with advance of the reaction, a VdF/HFP monomer mixture (78.0/22.0 in mole ratio) was fed under pressure to make up for the pressure reduction. Thus the reaction was carried out for 2.0 hours under constant conditions of 5.13 MPa and 120° C.

After completion of the reaction, the remaining monomer was released, and the obtained solid product was dried at 150° C. for 10 hours to give 86.1 g of a colorless transparent elastomer product.

According to $^{19}$F-NMR analysis, components of the elastomer product were VdF/HFP in mole ratio of 70.8/29.2. According to GPC analysis, a number average molecular weight and weight average molecular weight based on polystyrene were 11,000 and 22,000, respectively.

EXAMPLE 2

After the inside of a 548-ml stainless steel autoclave was replaced with nitrogen sufficiently, the autoclave was charged with 100 g of perfluorocyclobutane (C318), 114.2 g of hexafluoropropylene (HFP) and 40.2 g of vinylidene fluoride (VdF) in a vacuum state by means of a high pressure plunger pump and when an inside temperature of the system (reaction temperature) was increased to 120° C., an inside pressure of the system became 5.42 MPa.

Then a solution prepared by dissolving 1.18 g of PER-BUTYL I as an organic peroxide radical polymerization initiator in 4.00 g of 2,2,3,3-tetrafluoro-n-propyl alcohol was introduced into a reaction field with nitrogen under pressure to initiate a polymerization. The pressure and temperature in the polymerization reaction field were 5.42 MPa and 120° C., respectively. In those pressure and temperature conditions, since the pressure exceeds Pc of C318 (2.778 MPa) and the temperature exceeds Tc of VdF (30.15° C.), the formed reaction field was in a supercritical state of the present invention.

Since the pressure inside the polymerization system decreased with advance of the reaction, a VdF/HFP monomer mixture (78.0/22.0 in mole ratio) was fed under pressure to make up for the pressure reduction. Thus the reaction was carried out for 2.0 hours under constant conditions of 5.42 MPa and 120° C.

After completion of the reaction, the remaining monomer was released, and the obtained solid product was dried at 150° C. for 10 hours to give 140.9 g of a colorless transparent elastomer product.

According to $^{19}$F-NMR analysis, components of the elastomer product were VdF/HFP in mole ratio of 74.7/25.3. According to GPC analysis, a number average molecular weight and weight average molecular weight based on polystyrene were 21,000 and 40,000, respectively.

EXAMPLE 3

After the inside of a 548-ml stainless steel autoclave was replaced with nitrogen sufficiently, the autoclave was charged with 200 g of 1,1,1,2-tetrafluoroethane (R134a), 114.2 g of hexafluoropropylene (HFP) and 40.2 g of vinylidene fluoride (VdF) in a vacuum state by means of a high pressure plunger pump and when an inside temperature of the system (reaction temperature) was increased to 105° C., an inside pressure of the system became 6.30 MPa.

Then a solution prepared by dissolving 1.18 g of PER-BUTYL I as an organic peroxide radical polymerization initiator in 4.00 g of 2,2,3,3-tetrafluoro-n-propyl alcohol was introduced into a reaction field with nitrogen under pressure to initiate a polymerization. The pressure and temperature in the polymerization reaction field were 6.30 MPa and 105° C., respectively. In those pressure and temperature conditions, the formed reaction field was in a supercritical state of the present invention as mentioned in Example 1.

Since the pressure inside the polymerization system decreased with advance of the reaction, a VdF/HFP monomer mixture (78.0/22.0 in mole ratio) was fed under pressure to make up for the pressure reduction. Thus the reaction was carried out for 2.0 hours under constant conditions of 6.30 MPa and 105° C.

After completion of the reaction, the remaining monomer was released, and the obtained solid product was dried at 150° C. for 10 hours to give 31.8 g of a colorless transparent elastomer product.

According to $^{19}$F-NMR analysis, components of the elastomer product were VdF/HFP in mole ratio of 77.8/22.2. According to GPC analysis, a number average molecular weight and weight average molecular weight based on polystyrene were 19,000 and 36,000, respectively.

INDUSTRIAL APPLICABILITY

According to the supercritical polymerization method of the present invention, generation of unstable end groups of the polymer, a decrease in a purity and complicated post-treatment can be eliminated, and further an installation cost in commercial scale can be reduced.

What is claimed is:

1. A process for preparing a fluoropolymer by polymerizing one or more radically polymerizable monomers comprising vinylidene fluoride substantially in the absence of water in the presence of a radical polymerization initiator in a reaction field where the whole pressure in the polymerization system is from 4 to 10 MPa in an absolute pressure and at least one of the monomers is in a supercritical state.

2. The preparation process of claim 1, wherein the substance in a supercritical state is a monomer only.

3. A process for preparing a fluoropolymer by polymerizing one or more radically polymerizable monomers comprising vinylidene fluoride substantially in the absence of water in the presence of a radical polymerization initiator and an inactive fluorocarbon in a reaction field where the whole pressure in the polymerization system is from 4 to 10 MPa in an absolute pressure and at least one selected from the group consisting of the monomers and fluorocarbon is in a supercritical state.

4. The preparation process of claim 3, wherein the substance in a supercritical state is only at least one selected from the group consisting of the monomers and fluorocarbon.

5. The preparation process of claim 1, wherein the polymerization is carried out in the presence of a chain transfer agent.

6. The preparation process of claim 1, wherein the radically polymerizable monomer is one or more fluoroolefin monomers.

7. The preparation process of claim 1, wherein the radically polymerizable monomer is a mixture of one or more fluoroolefin monomers and a non-fluoroolefin monomer.

8. The preparation process of claim 3, wherein the inactive fluorocarbon is a hydrofluorocarbon and/or perfluorocarbon.

9. The preparation process of claim 1, wherein the radically polymerizable monomer is a mixture of vinylidene fluoride and hexafluoropropylene, a mixture of vinylidene fluoride, hexafluoropropylene and tetrafluoroethylene, a mixture of tetrafluoroethylene, propylene and vinylidene fluoride, a mixture of ethylene, hexafluoropropylene and vinylidene fluoride or a mixture of ethylene, hexafluoropropylene, vinylidene fluoride and tetrafluoroethylene.

10. The preparation process of claim 8, wherein the hydrofluorocarbon is pentafluoroethane, tetrafluoroethane, trifluoroethane, trifluoromethane or difluoromethane.

11. The preparation process of claim 8, wherein the perfluorocarbon is perfluoroethane or perfluorocyclobutane.

12. The preparation process of claim 1, wherein the radical polymerization initiator is an organic peroxide which does not contain a metal atom.

13. The preparation process of claim 1, wherein the fluoropolymer is a fluoroelastomer.

14. The preparation process of claim 3, wherein the polymerization is carried out in the presence of a chain transfer agent.

15. The preparation process of claim 3, wherein the radically polymerizable monomer is one or more fluoroolefin monomers.

16. The preparation process of claim 3, wherein the radically polymerizable monomer is a mixture of one or more fluoroolefin monomers and a non-fluoroolefin monomer.

17. The preparation process of claim 3, wherein the radically polymerizable monomer comprises a non-fluoroolefin monomer which is at least one selected from the group consisting of ethylene and propylene.

18. The preparation process of claim 3, wherein the radically polymerizable monomer is a mixture of vinylidene fluoride and hexafluoropropylene, a mixture of vinylidene fluoride, hexafluoropropylene and tetrafluoroethylene, a mixture of tetrafluoroethylene, propylene and vinylidene fluoride, a mixture of ethylene, hexafluoropropylene and vinylidene fluoride or a mixture of ethylene, hexafluoropropylene, vinylidene fluoride and tetrafluoroethylene.

19. The preparation process of claim 3, wherein the radical polymerization initiator is an organic peroxide which does not contain a metal atom.

20. The preparation process of claim 3, wherein the fluoropolymer is a fluoroelastomer.

21. The preparation process of claim 1, wherein the polymerization temperature is from 100 to 200° C.

* * * * *